(12) United States Patent
Freermann et al.

(10) Patent No.: US 8,491,744 B2
(45) Date of Patent: Jul. 23, 2013

(54) METHOD FOR THE PRODUCTION OF A CYLINDRICAL, STRAND-SHAPED PART

(75) Inventors: Reinhold Freermann, Ochtrup (DE); Ralf Winterstein, Meiningen (DE); Franz-Josef Riesselmann, Lohne (DE)

(73) Assignee: Uponor Innovation AB, Fristad (SE)

( * ) Notice: Subject to any disclaimer, the term of this patent is extended or adjusted under 35 U.S.C. 154(b) by 255 days.

(21) Appl. No.: 12/439,577

(22) PCT Filed: Aug. 31, 2007

(86) PCT No.: PCT/EP2007/059099
§ 371 (c)(1),
(2), (4) Date: May 19, 2009

(87) PCT Pub. No.: WO2008/028866
PCT Pub. Date: Mar. 13, 2008

(65) Prior Publication Data
US 2010/0065196 A1 Mar. 18, 2010

(30) Foreign Application Priority Data

Sep. 2, 2006 (EP) .................................... 06018394

(51) Int. Cl.
*B29C 47/04* (2006.01)
*F16L 9/147* (2006.01)

(52) U.S. Cl.
USPC ........ 156/244.14; 72/264; 138/145; 156/156; 156/244.11; 156/244.13; 264/171.27; 264/515

(58) Field of Classification Search
USPC ............. 264/171.16, 171.17, 171.26, 171.27, 264/171.28, 250, 515; 156/244.12, 244.13, 156/244.15, 156, 244.11; 164/94, 465; 72/46, 72/258, 259, 261, 264, 265; 138/138, 140, 138/143, 145
See application file for complete search history.

(56) References Cited

U.S. PATENT DOCUMENTS

| | | | | |
|---|---|---|---|---|
| 3,720,557 A | * | 3/1973 | Longoni et al. | ............... 156/156 |
| 4,093,693 A | * | 6/1978 | Lemelson | ................ 264/173.16 |
| 4,304,713 A | * | 12/1981 | Perelman | ..................... 264/45.9 |
| 4,370,186 A | * | 1/1983 | Blandin et al. | ................. 156/203 |
| 4,911,778 A | * | 3/1990 | Barnoach | ....................... 156/466 |

FOREIGN PATENT DOCUMENTS

| | | |
|---|---|---|
| AU | 2690971 | 9/1972 |
| CN | 1 342 549 | 4/2002 |
| DE | 21 39 388 | 2/1973 |
| DE | 3016134 | 10/1981 |
| DE | 4310272 | 10/1994 |
| DE | 4404492 | 6/1995 |
| DE | 19536689 | 4/1996 |

(Continued)

*Primary Examiner* — William Bell
(74) *Attorney, Agent, or Firm* — Occhiuti Rohlicek & Tsao LLP

(57) ABSTRACT

The invention relates to a method for producing a strand-shaped part, wherein a hollow section (16) of metal is extruded, the extruded metal hollow section (16) cools and/or is cooled, and a plastic strand (28) having one or more layers is extruded into the extruded metal hollow section (16) after or during cooling. The plastic strand (28) passes by a dispensing tool (24), exposed to the heat of the extruded metal hollow section (16) of an extruder (34). The dispensing tool is inserted into the metal hollow section (16) and comprises a dispensing outlet (26), which is disposed inside a region of the metal hollow section (16) in which the dispensing tool is cooled in relation to the temperature thereof during extrusion.

19 Claims, 3 Drawing Sheets

FOREIGN PATENT DOCUMENTS

Figure 1:
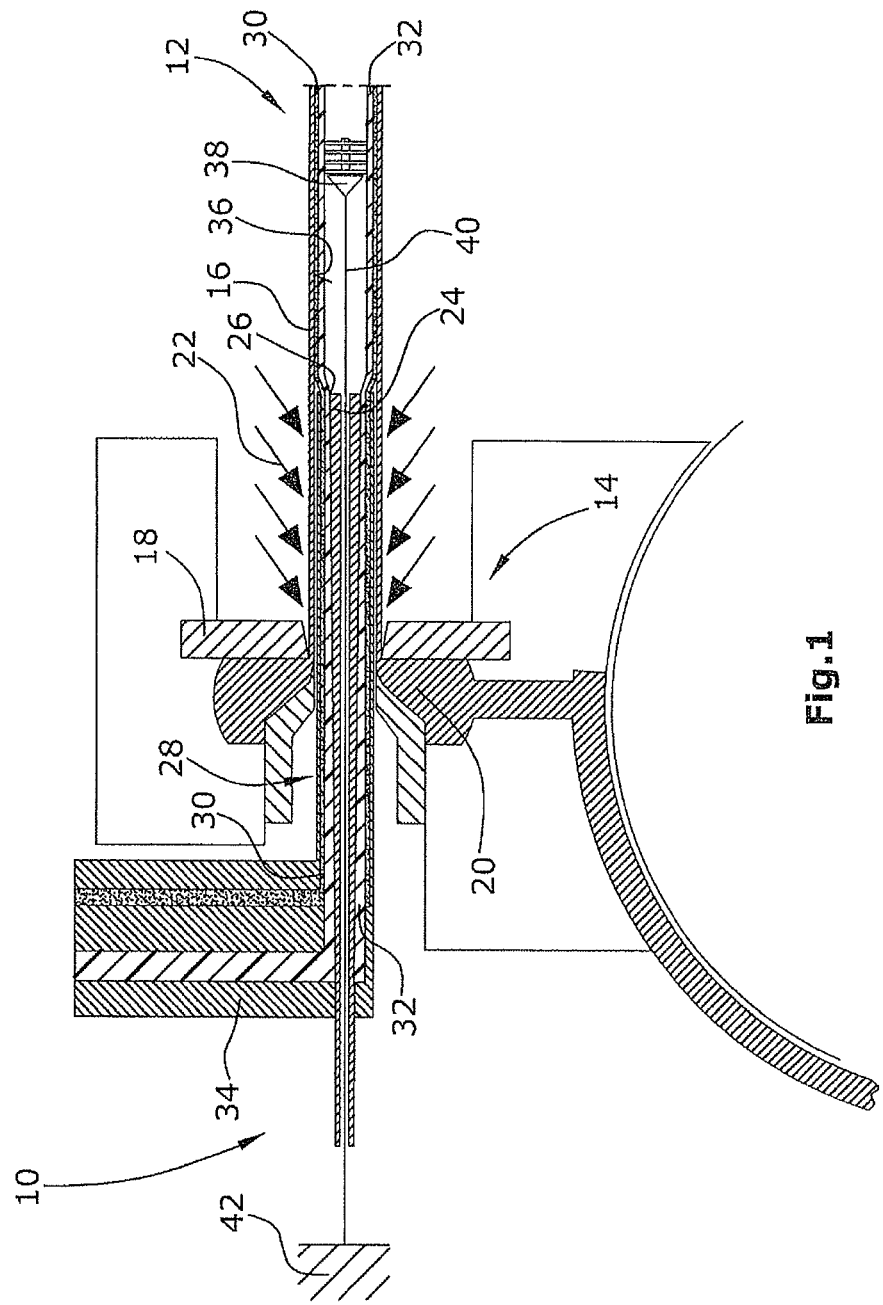

| | | |
|---|---|---|
| EP | 0 202 953 | 11/1986 |
| EP | 0353977 | 2/1990 |
| EP | 0494755 | 7/1992 |
| EP | 0581208 | 2/1994 |
| EP | 0691193 | 1/1996 |
| EP | 0920972 | 6/1999 |
| GB | 2274795 A * | 8/1994 |
| JP | 11309510 A | 11/1999 |
| WO | 88/03084 | 5/1988 |
| WO | 01/85430 | 11/2001 |

* cited by examiner

METHOD FOR THE PRODUCTION OF A CYLINDRICAL, STRAND-SHAPED PART

CROSS-REFERENCE TO RELATED APPLICATIONS

This application is the National Stage of International Application No. PCT/EP2007/059099 filed Aug. 31, 2007, which claims the priority of European Application No. 06018394.4, filed on Sep. 2, 2006. The contents of both applications are hereby incorporated by reference in their entirety.

The invention relates to a method for the production of a cylindrical, strand-shaped part. Particularly, the invention relates to the production of metal/plastic composite tubes as used e.g. in the field of sanitary installations and heater systems.

Metal/plastic composite tubes are used with increasing preference because they combine the advantages of the plastic deformability inherent to metal tubes with the advantages of the corrosion resistance of plastic tubes.

Metal/plastic composite tubes can be produced in various manners. Thus, for instance, it is known to produce the metal layer of such a composite tube by molding a metal strip, wherein the longitudinal edges of the metal strip over-lap each other and have been welded or bonded to each other, or the longitudinal edges of the metal strip have been connected by butt welding. Then, a one- or multi-layered plastic tube will be extruded into the interior of the thus formed metal tube. Examples of such production methods are found in DE-A-30 16 134, EP-A-0 353 977, EP-A-0 581 208, EP-A-0 920 972, WO-A-88/03084 and WO-A-01/85430.

Further, it is known to mold the metal tube while the tube is arranged on an already produced one- or multi-layered plastic tube. An example of such a production method is described in EP-A-0 691 193. Further examples are found in DE-A-43 10 272, DE-A-44 04 492 and DE-C-195 36 689.

Further still, it is also known to apply the metal layer of a metal/plastic composite tube directly onto an already produced plastic tube by extrusion. In EP-B-0 125 788, it is described that a metal tube is extruded onto a prefabricated plastic tube at a radial distance to the latter, said metal tube being subsequently reduced in diameter by a drawing process or a similar diameter-reducing process, so as to cause the plastic tube to tightly adhere. From U.S. Pat. No. 5,222,284, it is known to reduce the diameter of a prefabricated plastic tube in order to then extrude a metal tube around the plastic tube (by extrusion), whereupon the tube which has been reduced in diameter will widen again by memory effect, thus getting into close abutment on the metal tube from inside. Finally, DE-A-21 39 388 teaches to press a seamless metal tube onto a prefabricated plastic hose by use of a metal-coating press. A problem herein resides in the temperatures which are generated in the metal-coating press due to the extrusion of the metal and which will act on the plastic hose.

It is an object of the invention to provide a method for the production of a cylindrical, strand-shaped plastic/metal composite part which is distinguished by high dimensional stability.

According to the invention, to achieve the above object, there is provided a method for the production of a strand-shaped part wherein a hollow profile is extruded from metal,
the extruded metallic hollow profile is allowed to cool and/or is cooled, and
a one- or multi-layered plastic strand is extruded into said extruded metallic hollow profile prior to or after the cooling of said profile,
wherein said plastic strand is caused to pass a dispensing tool of an extruder, which has been inserted into said metallic hollow profile and is exposed to the heat of said extruded metallic hollow profile, said dispensing tool comprising a discharge opening arranged within a region of said metallic hollow profile where said profile has been cooled relative to its temperature during extrusion.

In the method according to the invention, there is first extruded the metallic layer or stratum of the cylindrical, strand-shaped part, i.e. it is produced by a continuous pressing or extrusion process while, the same time or subsequent thereto, a one- or multi-layered plastic strand is extruded into said metallic layer or stratum. This approach offers the advantage that the outer dimension of the cylindrical, strand-shaped part is defined by the extrusion process for the metallic layer or stratum, i.e. by the rod-extrusion process for the metal tube. Subsequent processing of the produced strand-shaped part for reducing its diameter and respectively for reducing the diameter of the metal tube will not be required anymore.

The metal tube, which after the extrusion process is in a heated state, will have a positive effect, together with the heated one- or multi-layered plastic melt, on the inner adherence to the metal tube.

The heat generated during extrusion of the metal is by far too high for still making it possible to extrude the plastic strand into the metallic hollow profile directly after extrusion. Instead, for this purpose, there is required a site within the metallic hollow profile which in the machine direction is located downstream of the extrusion of the metal. According to the invention, this is accomplished with the aid of a mandrel-shaped dispensing tool projecting far into the metallic hollow profile. This dispensing tool, which is substantially formed in the manner of a tube or mandrel, is operative to transport the plastic melt. To render it possible that said plastic melt will maintain its temperature, as required for extrusion, all the way along the relatively long traveling path through the dispensing tool, this dispensing tool would have to be heated.

Surprisingly, it has now been revealed that the heat emanating from the extruded metallic hollow profile can be utilized for the heating or tempering of the dispensing tool. Thereby, two effects are achieved, notably, on the one hand, that the metallic hollow profile will cool down by dissipation of its heat to the dispensing tool and, on the other hand, that the dispensing tool will be tempered without the need to use other, external heat sources.

Only by said subsequent extrusion of the plastic melt from inside into the seamlessly produced, extruded hollow metallic profile, the different materials, i.e. metal and plastic, can be processed together with dimensional stability. In the process, the high dimensional stability is obtained in that the metal tube has been produced without seams (extrusion). Pressing or extruding the metal tube onto a prefabricated metal tube, which would also lead to a high dimensional stability, is not feasible due to the high temperatures of the extruded metallic hollow profile. According to the invention, the extrusion of the plastic strand into the extruded metallic hollow profile will be successful because the dispensing tool has a considerable length so that the plastic melt will come into contact with the metallic hollow profile only when the latter has already cooled down to a temperature which is harmless to the plastic. In this regard, as already mentioned above, use is made of the fact that the tempering of the dispensing tool is performed along the full length thereof through the heat dissipation from the extruded metallic hollow profile.

The inventive method is useful particularly for the production of cylindrical, strand-shaped, hollow- or full-profiled parts. The method is particularly suited for the production of multi-layered plastic/metal composite tubes.

According to a modified variant of the invention, a one- or multi-layered plastic layer can be applied from outside onto the metal tube, preferably by extrusion. The extrusion of the outer plastic layer can be performed immediately onto the extruded metal tube or after the cooling of the metal tube. If a plurality of plastic layers are extruded, this can be carried out by tandem extrusion of the individual layers or by coextrusion.

According to an advantageous variant of the invention, the metal tube preferably consists of aluminum or an aluminum alloy. Said multi-layered plastic layers which can be extruded into the metal tube or can be applied outside to the metal tube, preferably comprise thermoplastic materials, wherein the respective plastic layers adjacent to the metal tube include thermoplastic adhesives.

The inventive method is particularly suited for the production of multi-layered plastic/metal composite tubes having larger diameters (e.g. from 40 mm) wherein, due to the wall thickness of the metal tube, it is possible only with high expenditure—after producing the metal tube—to reduce the diameter of the metal tube so as to establish the contact with the interior plastic strand. For this reason, according to the invention, this step of reducing the diameter of the metal tube is avoided in that the plastic strand will be extruded into the completely produced metal tube (notably on the inner side thereof). A disadvantage of the diameter reduction of the metal tube is also to be seen in that the changing of the shape of the metal will cause hardened regions in the material, which in turn will adversely affect the flexibility of the produced metal/plastic composite tube. In so far, the inventive method also has advantages in the production of multi-layered plastic/metal composite tubes of smaller sizes (e.g. up to 40 mm), since it will be possible to do without the diameter reduction of the metal tube which, in case of such tube dimensions, could be performed in a machine-controlled manner. Finally, by use of the invention, producing multi-layered plastic/metal composite tubes of smaller diameters will be possible also because the dispensing tool, in order to be tempered, does not need to be heated by separate heating elements or the like which would have to be provided as components of the dispensing tool and thus would enlarge its diameter; this need is obviated since the required heat for tempering the dispensing tool is made available by the heat of the extruded metallic hollow profile.

The heating of the dispensing tool by the extruded metallic hollow profile which is in the process of cooling down, is suitably accomplished by effecting a thermal coupling between both elements. In this regard, it is particularly useful if the extruded metallic hollow profile is caused to move over the dispensing tool while contacting the same. In the process, the dispensing tool can take over the further function of stabilizing the shape of the extruded metallic hollow profile during the phase immediately after extrusion. By way of alternative, the thermal coupling can also be effected in that the radiation heat of the metallic hollow profile is taken up by the dispensing tool. In this situation, the extruded metallic hollow profile extends along the dispensing tool while forming an air gap.

Suitably, the dispensing tool is realized as a tube or a mandrel-shaped tool including an annular space whose dispensing end is provided with an annular nozzle. Said annular space, which is defined by two mutually concentric walls or surfaces (e.g. tubes), can be stabilized by webs connecting said walls, or by similar means. These webs are surrounded by the passing flow of the plastic melt streaming through the annular space, which is not disadvantageous to the extrusion process of the plastic strand. In case of a multi-layered plastic-melt flow, the annular space should be free along its whole length. The tubes being generated between the annular space will then become fixed to each other on one of their ends, respectively.

As already mentioned above, the inventive method is also suited for the production of full-profiled parts. For instance, the inventive method can be used for the production of a cable enclosed by plastic or metal, or of another full or hollow profile having a substantially non-deformable and temperature-resistant shape, such as e.g. a metal tube. The cable and respectively profile is centrally passed through annular nozzles of the extruder for the plastic strand and the metal tube so that, during the extrusion of the plastic strand, the space between the centrally arranged conductor and the metal tube will be filled with plastic material. This plastic material can be e.g. a foamable plastic material. In this case, an adhesive is not necessarily required if it is guaranteed that the foamable plastic will by itself adhere to the inner side of the metal tube with sufficient stability.

Figure 2:
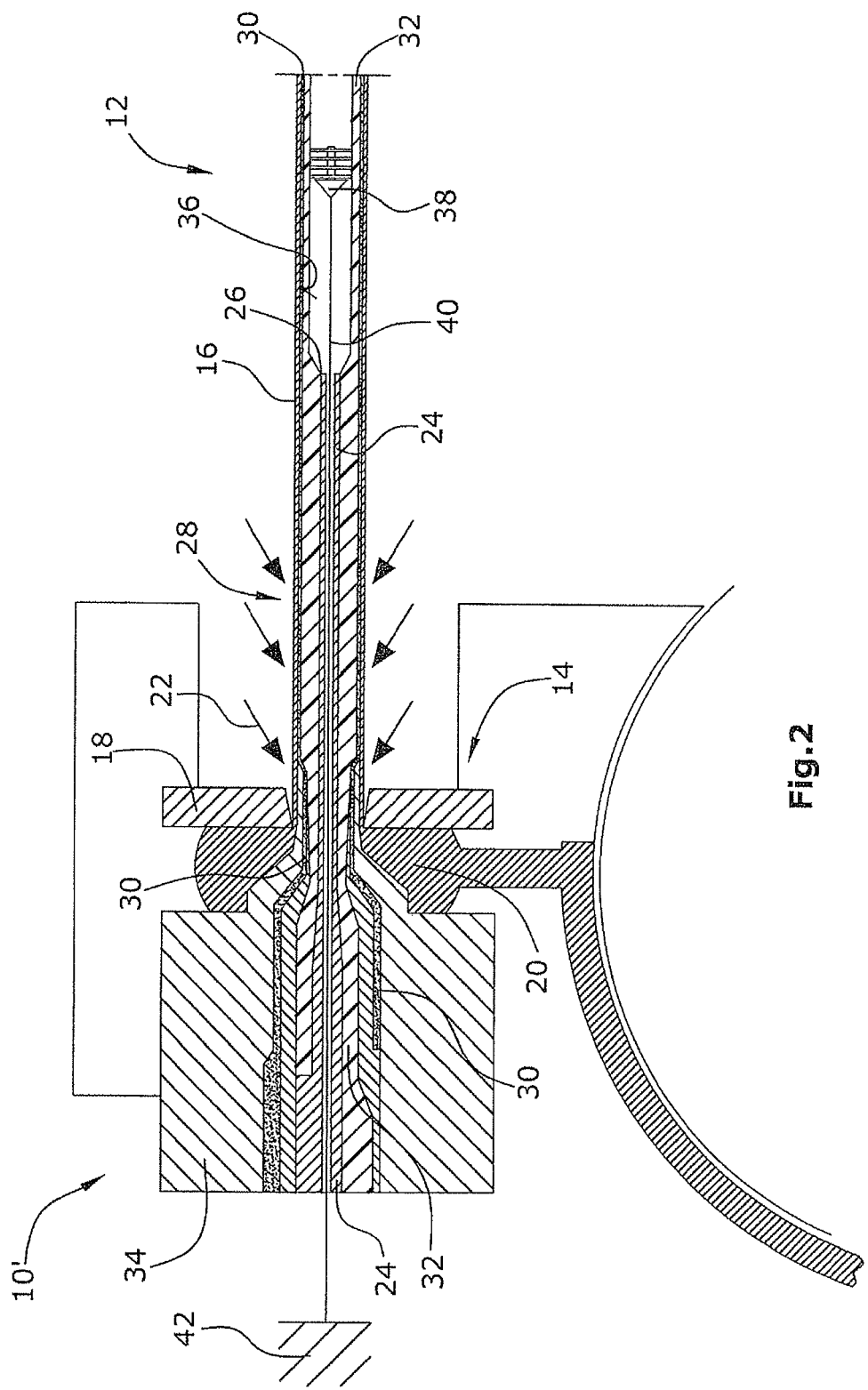
Figure 3:
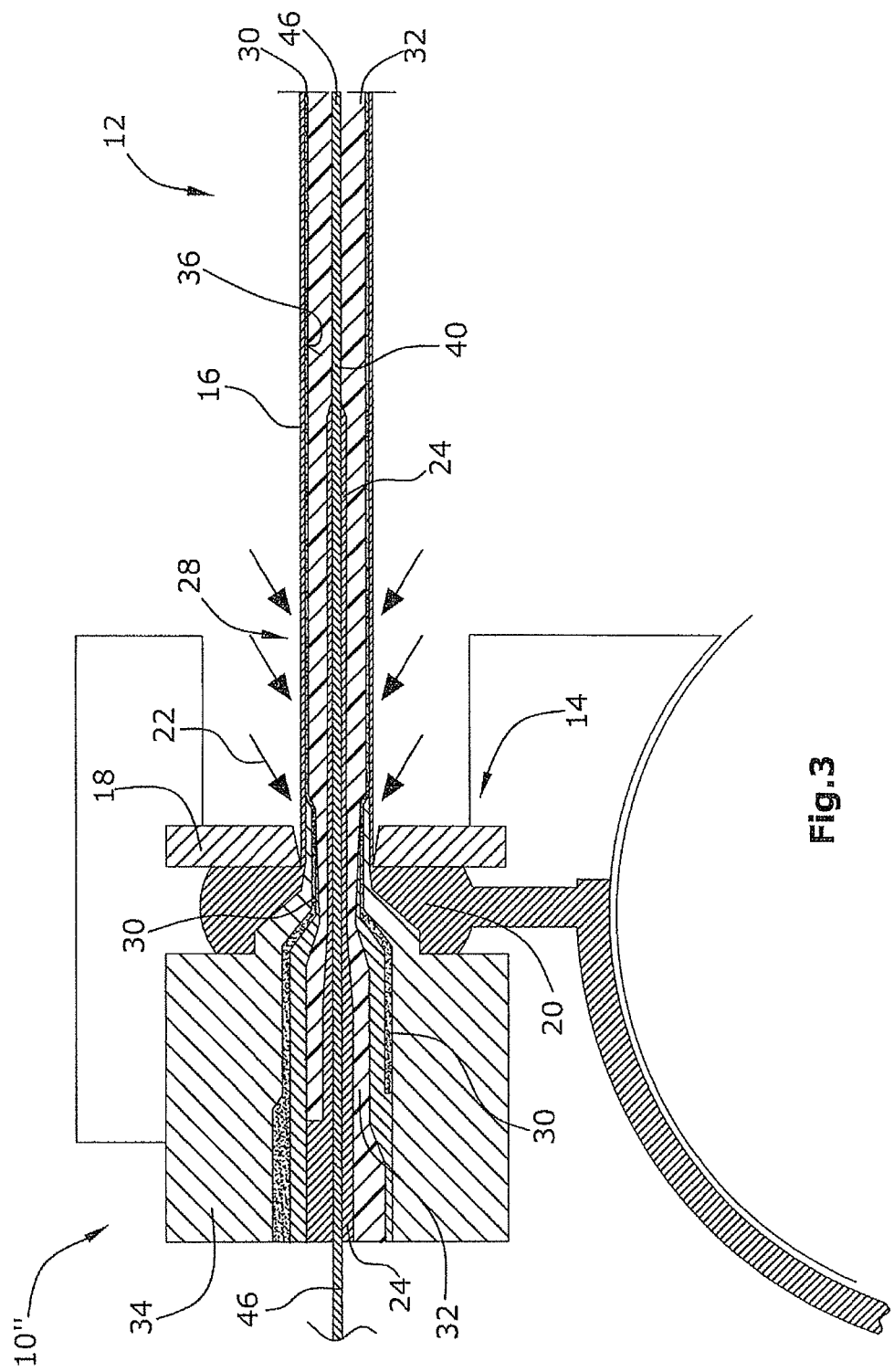

The invention will be explained in greater detail hereunder by example of specific variants and with reference to the drawings. In the drawing, the following is illustrated:

FIG. 1 shows the components of an extrusion plant for the production of a cylindrical, strand-shaped hollow profile according to a first variant of the invention, FIG. 2 shows the components of an extrusion plant for the production of a cylindrical, strand-shaped hollow profile according to a second variant of the invention, and FIG. 3 shows the components of an extrusion plant for the production of a cylindrical, strand-shaped full profile according to a first and a second variant of the invention.

FIG. 1 schematically illustrates the essential plant components of a device 10 for the production of a multi-layered plastic/metal composite tube 12. Said device 10 includes an extruder 14 and respectively a pressing unit for producing an aluminum tube 16. The annular nozzle of extruder 14 is shown at 18, and the metal which is being heated for the process of plastic deformation is designated by 20. The extruded aluminum tube 16 will be extruded e.g. at temperatures between 450° and 500° C. and will then cool down after discharge from nozzle 18 (e.g. to 200° to 250°, as indicated at 22).

A hollow mandrel 24 centrically extends into the extruded metal tube 16 through the annular nozzle 18, said mandrel 24 on one of its ends comprising an annular nozzle 26 for discharge of a two-layered, hollow-cylindrical plastic strand 28 which on the outside comprises a plastic adhesive layer 30 and on the inside an inner plastic layer 32 forming the later base tube. Both plastic layers together will be extruded by a coextruder 34 into the cooled metal tube 16, notably against the inner side of the tube. To ensure that the plastic melt will remain there, a gas, e.g. air, will be introduced via the mandrel 24 into the plastic-melt tube (hollow-cylindrical plastic-melt strand 28), thus building up an overpressure. The overpressure in the hollow-cylindrical plastic-melt strand 28 will be maintained with the aid of a plug 38 arranged therein, which plug is fastened at 42 externally of the extrusion components of device 10 by means of a cord 40 guided through the hollow core 24. Instead of using the plug 38, the produced metal tube 16 with interior plastic strand can be closed by squeezing so as to prevent leakage of overpressure.

FIG. 2 illustrates a slightly modified variant 10' of a device for the production of a multi-layered plastic/metal composite tube 12. In as far as the plant components shown in FIG. 2 are identical or functionally equivalent to the plant components according to FIG. 1, they are designated by the same reference numerals.

In the device 10' of FIG. 2, by way of contrast to device 10 of FIG. 1, the metal tube 16 and the plastic strand 28 will be coextruded. Except for this, the production process is performed as described above.

FIG. 3 illustrates a device 10" which is of a configuration similar to that of device 10' of FIG. 2 but which in FIG. 3 serves for the production of a cylindrical, strand-shaped, full- or hollow-profiled part 44 having a substantially non-deformable and temperature-resistant shape. In FIG. 3, the components identical to the plant components and elements depicted in FIGS. 1 and 2 are designated by the same reference numerals.

In the device 10" of FIG. 3, the metal tube 16 and the plastic strand 28 are again substantially coextruded. Extending through the hollow mandrel 24 of extruder 34 for the plastic strand 28 is an electric conductor 46 which after leaving the hollow mandrel 24 will be embedded in and enclosed by the material of plastic strand 28 so that the plastic material will be arranged between the inner side 36 of metal tube 16 and the electric conductor 46. Thus, device 10" of FIG. 3 is useful e.g. for the production of electrically insulated cables which comprise a metallic tube including the electric conductor 46 with interposition of a plastic material.

Concerning the devices 10, 10' and 10" shown in FIGS. 1 to 3, it should still be noted that these devices can additionally comprise one or a plurality of extruders or a coextruder for applying one- or multi-layered plastic layers onto metal tube 16 from outside. For ease of survey, these additional extruders, which are generally known in the production of tubes, are not illustrated in FIGS. 1 to 3.

The invention claimed is:

1. A method for the production of a strand-shaped part, comprising
    extruding a hollow profile from metal at an extrusion point in a direction of extrusion, the hollow profile extending away from the extrusion point and along the direction of extrusion,
    allowing the extruded metallic hollow profile to cool and extruding a one- or multi-layered plastic strand into said extruded metallic hollow profile prior to or after the cooling of said profile,
    causing said plastic strand to pass a dispensing tool of an extruder, the dispensing tool including a duct for transmission of the plastic strand to a discharge opening of the dispensing tool,
    wherein the dispensing tool is configured to conduct heat from the extruded metallic hollow profile and into the plastic strand when the dispensing tool is inserted into said metallic hollow profile and is exposed to the heat of said extruded metallic hollow profile, the discharge opening arranged downstream from the extrusion point along the direction of extrusion, and within a region of said metallic hollow profile, said profile having been cooled relative to a temperature of said profile during extrusion.

2. The method according to claim 1, wherein the dispensing tool is thermally coupled to the metallic hollow profile and is tempered by said profile.

3. The method according to claim 1, wherein the dispensing tool is in contact with the inner sides of the metallic hollow profile.

4. The method according to claim 1, including applying a one- or multi-layered plastic layer from outside onto the metallic hollow profile by extrusion, tandem extrusion or coextrusion.

5. The method according to claim 4 wherein said plastic layer applied outside onto the metallic hollow profile comprises an inner layer of adhesive adjacent to the metallic hollow profile, and an outer layer of polymer material adjacent to said inner layer.

6. The method according to claim 1, including forming said one- or multi-layered plastic strand extruded into the metallic hollow profile as a plastic tube and generating an overpressure within the plastic tube for pressing the plastic tube against the metal tube.

7. The method according to claim 1, including molding said one- or multi-layered plastic strand as a full profile and inserting a full- or hollow-profile member thereinto during the extrusion of said full profile, said full- or hollow-profile member being in a substantially non-deformable and temperature-resistant state and comprising a one- or multi-cored electrical conductor.

8. The method according claim 1, wherein the metallic hollow profile comprises a metal which is plastically deformable and extrudable below its melting point, or a metal alloy which is plastically deformable and extrudable below its melting point.

9. The method according to claim 8, wherein said metal comprises aluminum or said metal alloy comprises an aluminum alloy.

10. The method according to claim 1, wherein the plastic strand comprises an outer layer made of an adhesive and a polymer material layer adjacent to said outer layer.

11. The method according to claim 1 including providing the metal tube and the plastic strand by serially arranged extruders.

12. The method according to claim 11, wherein providing the metal tube and the plastic strand includes coextruding.

13. The method according claim 1 wherein the metallic hollow profile is a metal tube.

14. The method according to claim 1 wherein the plastic strand comprises a foamable plastic material having adhering or non-adhering properties with respect to said metal.

15. The method according to claim 1 wherein the dispensing tool comprises a mandrel including an annular space having its axial end provided with an annular nozzle for use as a dispensing orifice of said mandrel.

16. The method according to claim 1 wherein allowing the extruded metallic hollow profile to cool includes actively cooling the extruded metallic hollow profile.

17. The method of claim 1 wherein the one- or multi-layered plastic strand includes a thermoplastic material.

18. The method of claim 17 wherein the extruded metallic hollow profile is cooled to a temperature less than 250° C. before the one- or multi-layered plastic strand is extruded into the extruded metallic hollow profile.

19. The method of claim 1 wherein the extruded metallic hollow profile is extruded at a temperature less than 500° C.

* * * * *